United States Patent
Chen et al.

(10) Patent No.: US 12,211,188 B2
(45) Date of Patent: Jan. 28, 2025

(54) IMAGE DEWARPING DEVICE AND METHOD

(71) Applicant: WELTREND SEMICONDUCTOR INC., Hsinchu (TW)

(72) Inventors: Hsuan-Ying Chen, Hsinchu (TW); Hung-Chih Chiang, Hsinchu (TW); Ta Hsien, Hsinchu (TW); Te-Wei Hsu, Hsinchu (TW); Meng-Che Tsai, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 590 days.

(21) Appl. No.: 17/680,269

(22) Filed: Feb. 24, 2022

(65) Prior Publication Data
US 2023/0196523 A1   Jun. 22, 2023

(30) Foreign Application Priority Data
Dec. 17, 2021   (TW) ................................. 110147310

(51) Int. Cl.
*G06T 5/80*   (2024.01)
*G06T 3/18*   (2024.01)

(52) U.S. Cl.
CPC .................. *G06T 5/80* (2024.01); *G06T 3/18* (2024.01); *G06T 2207/20021* (2013.01)

(58) Field of Classification Search
CPC ..... G06T 5/80; G06T 3/18; G06T 2207/20021
See application file for complete search history.

(56) References Cited

U.S. PATENT DOCUMENTS

2021/0335276 A1 * 10/2021 In ............................. G09G 3/20

FOREIGN PATENT DOCUMENTS

CN           103780830 A       5/2014

* cited by examiner

*Primary Examiner* — Sam Bhattacharya
(74) *Attorney, Agent, or Firm* — Winston Hsu (57) ABSTRACT

Image dewarping includes capturing a source image from a camera, selecting an input row of pixels from the source image, if the input row of pixels comprises a plurality of input pixels in a region of interest in the source image, storing the plurality of input pixels to a memory to generate an input segment of pixels, when a plurality of pixels required to generate an output row of pixels are all stored in the memory, reading from the memory the plurality of pixels corresponding to the output row of pixels, and performing coordinate transformation on the plurality of pixels to generate the output row of pixels, and when coordinate transformation has been completed on the plurality of pixels, releasing from the memory an input segment of pixels of the plurality of input segments of pixels that does not correspond to other output rows of pixels.

18 Claims, 8 Drawing Sheets

IMAGE DEWARPING DEVICE AND METHOD

BACKGROUND OF THE INVENTION

1. Field of the Invention

The present invention is related to an image dewarping device and method, and more particularly to an image dewarping device and method that can reduce memory loading.

2. Description of the Prior Art

With the advancement of image processing technology, various new applications have been developed, such as object tracking, spatial measurement, augmented reality and machine vision. When high-precision images are required for the application, there are often errors caused by distortion of the source image. In the field image detection and recognition, a wide-angle lens or a fisheye lens is often used to reduce the number of lenses because of the need to obtain a larger viewing range. However, wide-angle lenses or fisheye lenses often cause image distortion. The distorted image would degrade the visual effect, thereby affecting the performance of the image applications. Therefore, it is necessary to use image dewarping to optimize the visual effect to improve the accuracy of image application.

Image dewarping is a method of correcting image distortion caused by wide-angle or fisheye lenses. Various mathematical methods are applied to distorted images and the result is images with straightened lines and with objects that look natural. The existing image dewarping method consumes a lot of memory and computing resources. Under limited memory, such as an IOT (Internet of Things) device, existing image dewarping process and subsequent applications are likely to cause a large time delay. Hence, there is a need for a device with a method that can reduce memory loading and perform image dewarping in real time under limited memory resource.

SUMMARY OF THE INVENTION

An embodiment provides a method of image dewarping. The method includes capturing a source image from a camera, selecting an input row of pixels from the source image, if the input row of pixels comprises a plurality of input pixels in a region of interest (ROI) in the source image, storing the plurality of input pixels to a memory to generate an input segment of pixels, when a plurality of pixels required to generate an output row of pixels are all stored in the memory, reading from the memory the plurality of pixels corresponding to the output row of pixels and performing coordinate transformation on the plurality of pixels to generate the output row of pixels, and when coordinate transformation has been completed on the plurality of pixels, releasing from the memory an input segment of pixels of the plurality of input segments of pixels that does not correspond to other output rows of pixels. The input segment of pixels is a portion of the input row of pixels stored in the memory.

Another embodiment provides a method of image dewarping. The method includes capturing a source image from a camera, selecting an input row of pixels from the source image, dividing the input row of pixels into P input segments of pixels, if the input row of pixels comprises a plurality of input pixels in a region of interest (ROI) in the source image, storing the plurality of input pixels to a memory, when a plurality of pixels required to generate an output row of pixels are all stored in the memory, reading from the memory the plurality of pixels corresponding to the output row of pixels and performing coordinate transformation on the plurality of pixels to generate the output row of pixels, and when coordinate transformation has been completed on the plurality of pixels, releasing from the memory an input segment of pixels of the plurality of input segments of pixels that does not correspond to other output rows of pixels. P is an integer greater than 1.

An embodiment provides a device of image processing. The device includes a camera, a memory, and a processor coupled to the camera and the memory. The processor coupled to the camera and the memory. The processor is for capturing a source image from a camera, selecting an input row of pixels from the source image, if the input row of pixels comprises a plurality of input pixels in a region of interest (ROI) in the source image, storing the plurality of input pixels to a memory to generate an input segment of pixels, wherein the input segment of pixels is a portion of the input row of pixels stored in the memory, when a plurality of pixels required to generate an output row of pixels are all stored in the memory, reading from the memory the plurality of pixels corresponding to the output row of pixels and performing coordinate transformation on the plurality of pixels to generate the output row of pixels, and when coordinate transformation has been completed on the plurality of pixels, releasing from the memory an input segment of pixels of the plurality of input segments of pixels that does not correspond to other output rows of pixels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
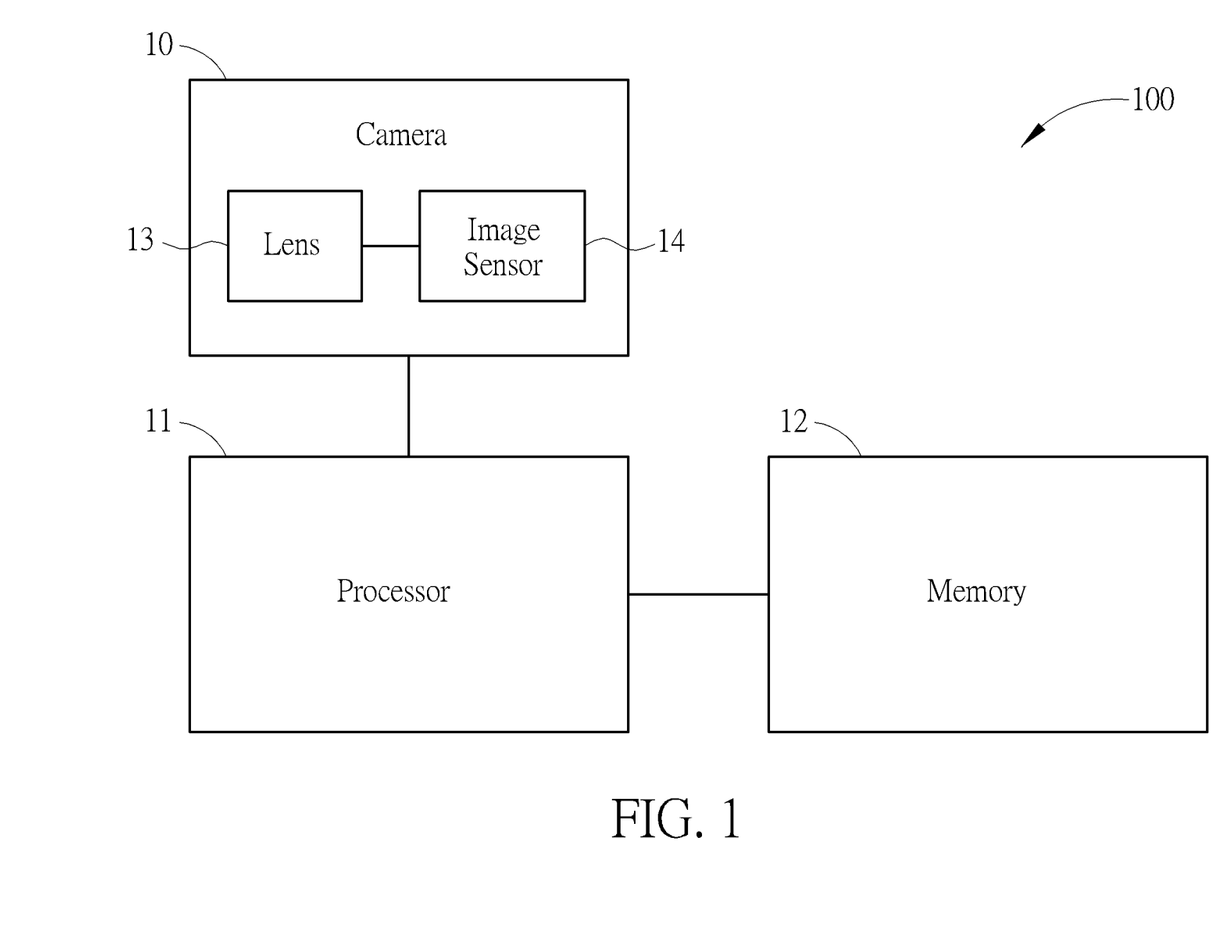
FIG. 1 is a diagram illustrating an image dewarping device of an embodiment of the present invention.

FIG. 1 is a diagram illustrating an image dewarping device 100 of an embodiment of the present invention. The image dewarping device 100 can be applied to correct warped images captured by a wide-angle lens or a fisheye lens. The image dewarping device 100 includes a camera 10, a processor 11 and a memory 12. The camera 10 is for capturing images. The camera 10 may include any image capture device. For example, the camera 10 may have a built-in lens 13, such as a wide-angle lens, a fisheye lens, or any lens that may cause image distortion. The camera 10 may also include an image sensor 14, such as a complementary metal oxide semiconductor (CMOS). The processor 11 is coupled to the camera 10 for processing the image. The processor 11 can be any form of processing device, such as a central processing unit, a microprocessor, a logic operation unit, a programmable chip or any other processor that can process images. The memory 12 is coupled to the processor 11 for buffering image processing data. The memory 12 can be any form of memory device, such as random access memory (RAM) or non-volatile memory. The processor 11 can determine which pixels in the image captured by the camera 10 are to be stored to the memory 12, and further perform coordinate transformation on the pixels stored in the memory 12 to achieve image dewarping.

Figure 2:
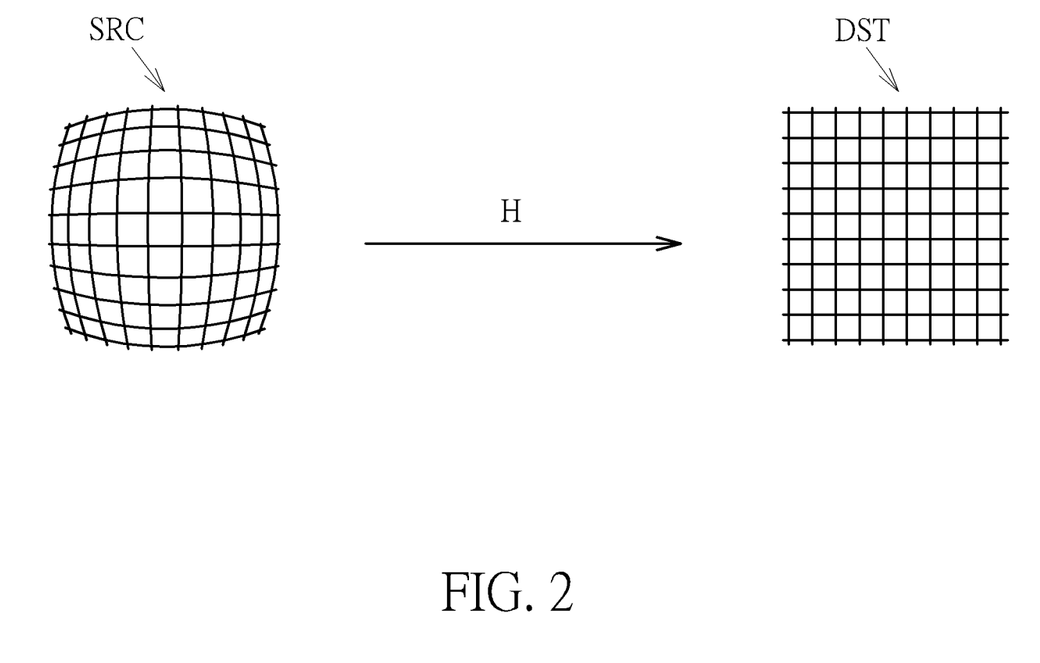
FIG. 2 is a diagram illustrating an image dewarping process.

FIG. 2 is a diagram illustrating an image dewarping process. The image captured by a wide-angle lens or fisheye lens is distorted, such as the source image SRC. The processor 11 can transform the source image SRC into the corrected destination image DST through the coordinate transformation matrix H. Generally, the camera 10 would first store the entire source image SRC to the memory 12, and then the processor 11 would transform the source image SRC into the corrected destination image DST through the coordinate transformation matrix H. After the destination image DST is produced, the memory space occupied by the source image SRC in the memory 12 is then released. The coordinate transformation matrix H can be generated by the processor 11 according to the lens parameters of the lens 13. However, the entire source image SRC often occupies a large amount of memory space, resulting in over consumption of resource in the image dewarping device 100. This may cause the bottleneck in the processor 11 accessing the image. Thus, more memory is needed in order to maintain the efficiency of image processing. The image dewarping method proposed in the embodiment can release part of the space of the memory 12 before the completing the destination image DST transformation, and thus maintaining the efficiency of image processing.

Figure 3A:
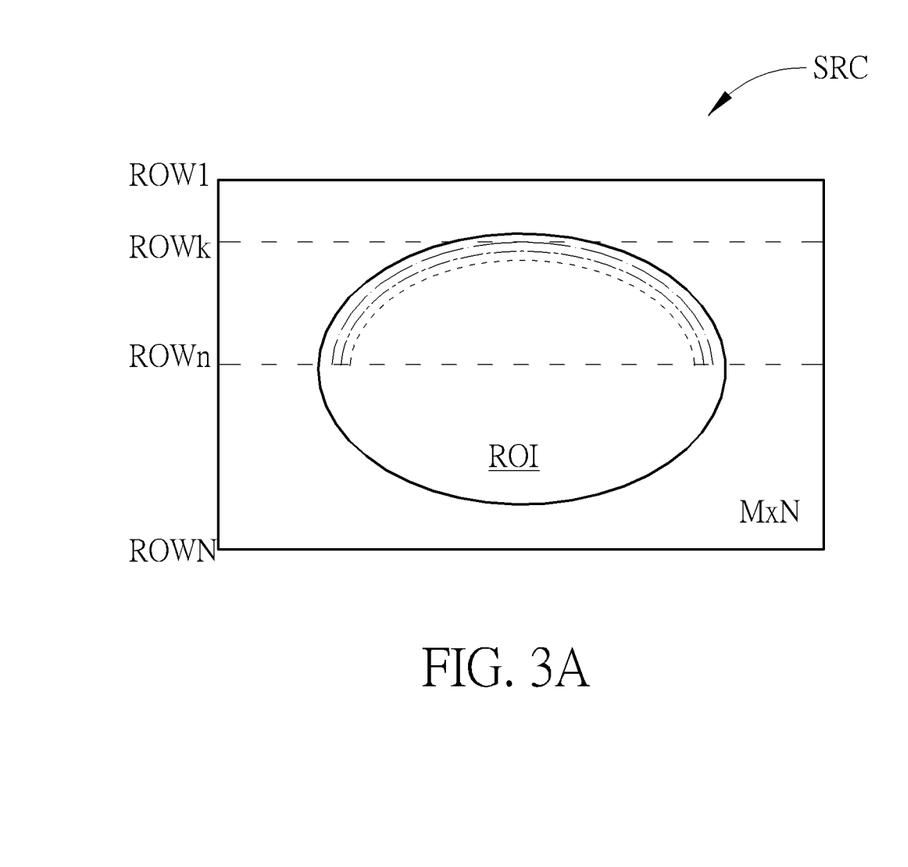
FIGS. 3A and 3B are diagrams illustrating the image dewarping process of an embodiment.
Figure 3B:
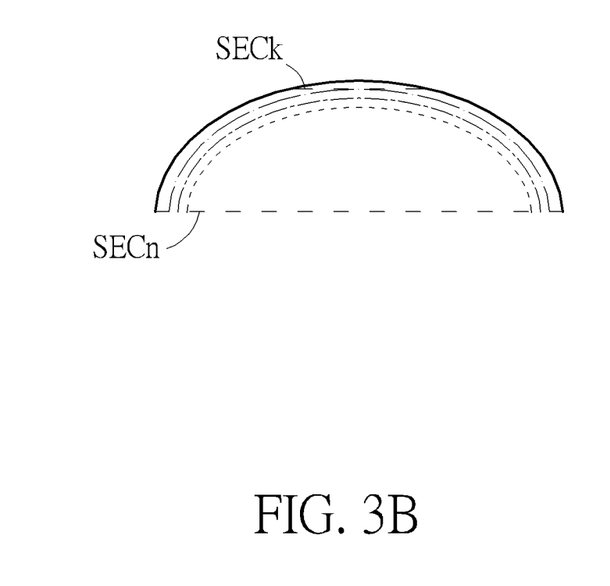

FIGS. 3A and 3B are diagrams illustrating the image dewarping process of an embodiment of the present invention. The source image SRC may be an image captured by the lens 13 with the image sensor 14. The source image SRC includes M×N pixels (e.g., 1920×1080 pixels). In practice, the image sensor 14 can divide the pixels in the source image SRC into N input rows of pixels ROW1~ROWN, and transfer the N input rows of pixels to the processor 11 sequentially from top to bottom. In the embodiment, the region of interest ROI can be drawn from the source image SRC according to the lens parameters of the lens 13, and an N×2 table can be generated to record the starting and ending coordinates the N input rows of pixels in the region of interest ROI. An example of a table is shown below:

TABLE 1

| Input Row | Starting Coordinate | Ending Coordinate |
|---|---|---|
| 1 | 0 | 0 |
| 2 | 0 | 0 |
| 3 | 0 | 0 |
| . | . | . |
| 110 | 904 | 1016 |
| 111 | 867 | 1053 |

TABLE 1-continued

| Input Row | Starting Coordinate | Ending Coordinate |
|---|---|---|
| 112 | 819 | 1101 |
| . | . | . |
| 539 | 355 | 1565 |
| 540 | 355 | 1565 |
| 541 | 355 | 1565 |
| . | . | . |
| N | 0 | 0 |

Figure 4A:
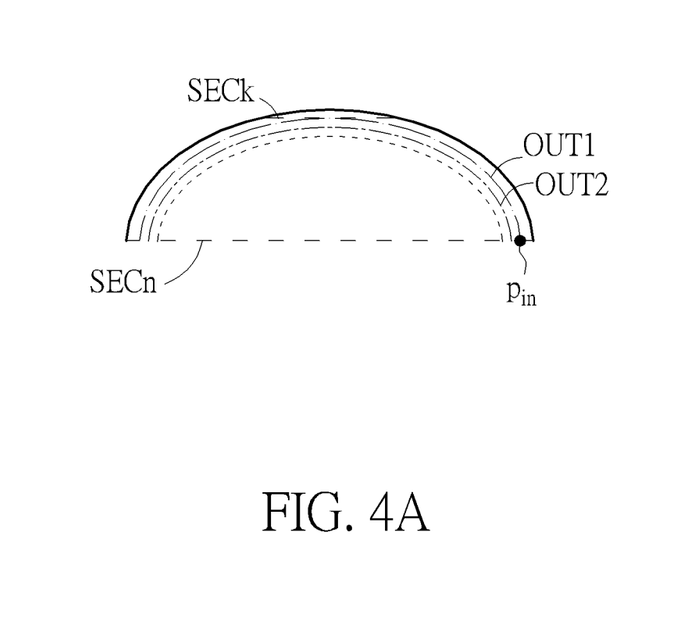
FIGS. 4A and 4B are further diagrams illustrating the image dewarping process of the embodiment.
Figure 4B:
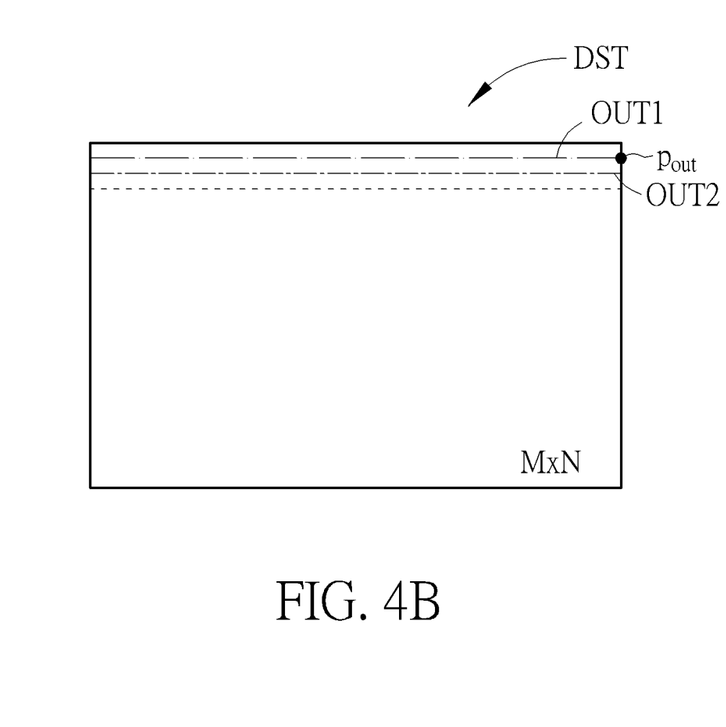

The number N can be determined by the image resolution. For example, N can be 1080, 2048 and so on. The processor 11 can determine which input pixels are located in the region of interest ROI according to the first table. As shown in the first table, if the input row of pixels does not include input pixels located in the region of interest ROI, the starting and ending coordinates are both 0. Taking the Input Row 540 as an example, the 355th-1565th pixels of the Input Row 540 can be stored to the memory 12. Furthermore, the input rows of pixels ROW1~ROWN are sequentially transferred to the memory 12 from top to bottom. As shown in FIG. 3A, because the input row of pixels ROW1 has no input pixels located in the region of interest ROI, the input row of pixels ROW1 would not be stored to the memory 12. In contrast, the input row of pixels ROWk includes input pixels located in the region of interest ROI, such as the input segment of pixels SECk in FIG. 3B, these input pixels located in the region of interest ROI would be stored to the memory 12. The input row of pixels ROWn in FIG. 3A also includes input pixels located in the region of interest ROI, such as the input segment of pixels SECn in FIG. 3B. These input pixels located in the region of interest ROI would also be stored to the memory 12. Likewise, other input rows of pixels are done by the same process FIGS. 4A and 4B are the continuation of FIGS. 3A and 3B. FIGS. 4A and 4B are diagrams illustrating the image dewarping process of the embodiment. In the process of image dewarping, it is not necessary to wait until the entire source image SRC is transferred to the memory 12 before performing image dewarping. In the embodiment, coordinate transformation can be performed simultaneously during the time period when the source image SRC is being transformed. As shown in FIG. 4A, the input segments of pixels SECk~SECn include the input pixels required to generate the output row of pixels OUT1. When the input segments of pixels SECk~SECn are all stored in the memory 12, the processor 11 can read from the memory 12 the input pixels corresponding to the output row of pixels OUT1 and perform coordinate transformation on the input pixels according to the coordinate transformation matrix H to generate the output row of pixels OUT1. The equation for coordinate transformation is as follows:

$$p_{dst} = H p_{src}$$

$p_{src}$ is the pixel coordinates of the source image SRC, and $p_{dst}$ is the pixel coordinates of the destination image DST.

A schematic diagram illustrating the destination image DST is shown in FIG. 4B. The input rows of pixels ROW1~ROWN are sequentially transferred to the memory 12 from top to bottom. When the output row of pixels OUT1 is generated, the coordinate transformation has been completed for the input pixels of the first input segment of pixels SECk. Also, the input segment of pixels SECk does not correspond to output rows of pixels other than the output row of pixels OUT1. At this time, the memory space occupied by the input segment of pixels SECk can be released. However, the input segment of pixels SECn still includes pixels that are still needed for coordinate transformation, so the input segment of pixels SECn cannot be released from the memory 12 yet. It can only be released after all the pixels of the input segment of pixels SECn have completed the coordinate transformation. The memory space of the memory 12 can be released for other applications, thus speeding up image processing. The same method can be applied to generate the output row of pixels OUT2 and the remaining output rows of pixels until the coordinate transformation has been completed for the source image SRC and the destination image DST.

In the embodiment, the coordinate transformation matrix H can be obtained according to the internal and external parameters of the lens 13:

$$sp = A[Rt]P = HP$$

$$H = \begin{bmatrix} h_{11} & h_{12} & h_{13} \\ h_{21} & h_{22} & h_{23} \\ h_{31} & h_{32} & h_{33} \end{bmatrix}$$

The lowercase p is the image plane coordinates. s is scale. A is the camera parameter matrix, including the focal length. R is the image rotation parameter matrix. t is the image shift parameter matrix. The uppercase P is the world coordinates. The method for obtaining the coordinate transformation matrix H is known to those skilled in the art, and is not be repeated herein.

In addition, one can also find out the coordinates corresponding to the last input pixel of the output row of pixels OUT1 according to the pixel coordinates of the output row of pixels OUT1 and the coordinate transformation matrix H, so as to determine the timing for performing coordinate transformation for the input pixels corresponding to the output row of pixels OUT1. For example, using the coordinates of the last pixel $p_{out}$ in the output row of pixels OUT1 (shown in FIG. 4B) and the coordinate transformation matrix H, one can obtain the coordinates corresponding to the input pixel $p_{in}$ (shown in FIG. 4A) with the equation:

$$p_{in} = Hp_{out}$$

In other words, when the input pixel $p_{in}$ is stored to the memory 12, at this time all the pixels required to generate the output row of pixels OUT1 are stored in the memory 12, and the processor 11 can start to perform the coordinate transformation to generate the output row of pixels OUT1.

Figure 5:
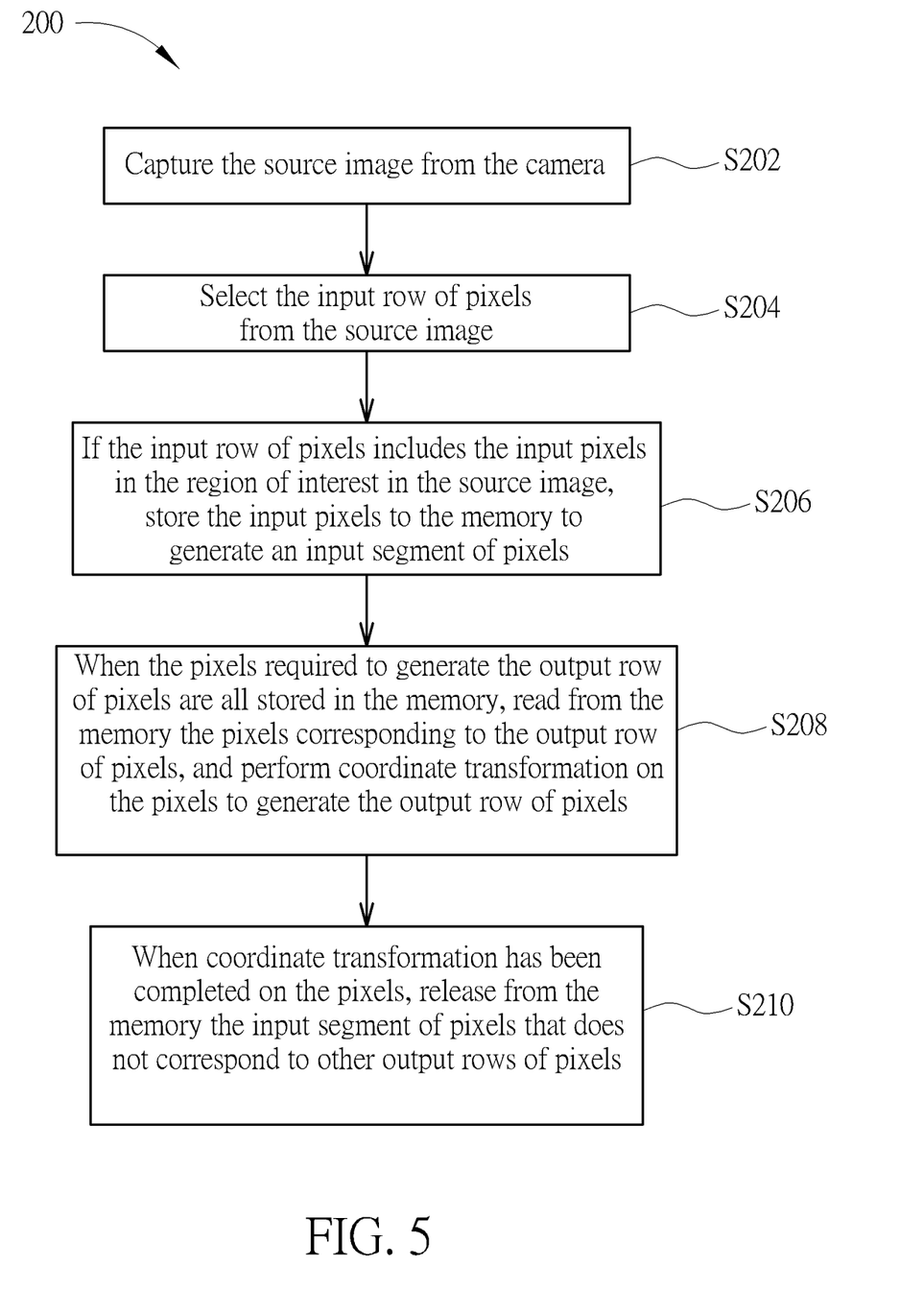
FIG. 5 is a flowchart of the image dewarping method of the embodiment.

FIG. 5 is a flowchart of the image dewarping method 200. The image dewarping method 200 includes the following steps:

S202: Capture the source image SRC from the camera 10;
S204: Select the input row of pixels ROWk from the source image SRC;
S206: If the input row of pixels ROWk includes the input pixels in the region of interest ROI in the source image SRC, store the input pixels to the memory 12 to generate an input segment of pixels SECk;
S208: When the pixels required to generate the output row of pixels OUT1 are all stored in the memory 12, read from the memory 12 the pixels corresponding to the output row of pixels OUT1, and perform coordinate transformation on the pixels to generate the output row of pixels OUT1; and
S210: When coordinate transformation has been completed on the pixels, release from the memory 12 the input segment of pixels (such as input segment of pixels SECk) that does not correspond to other output rows of pixels.

After releasing the memory space occupied by the input segment of pixels SECk, the processor 11 can wait until all the pixels required to generate the output row of pixels OUT2 have been stored in the memory 12, and then use the coordinate transformation matrix H to perform coordinate transformation on the pixels to generate output row of pixels OUT2. Then, the input segment of pixels that has completed coordinate transformation and does not correspond to other output rows of pixels can be released from the memory 12. The process can be repeated until the coordinate transformation has been completed for the source image SRC and the destination image DST.

The image dewarping method provided by the embodiment does not need to store the entire source image SRC. It can simultaneously transform and output the rows of pixels of the destination image DST while inputting the rows of pixels of the source image SRC to the memory 12. It can also the release input segments of pixels before other pixels complete coordinate transformation. This method reduces memory loading and improves image processing performance under limited computing resources.

Figure 6:
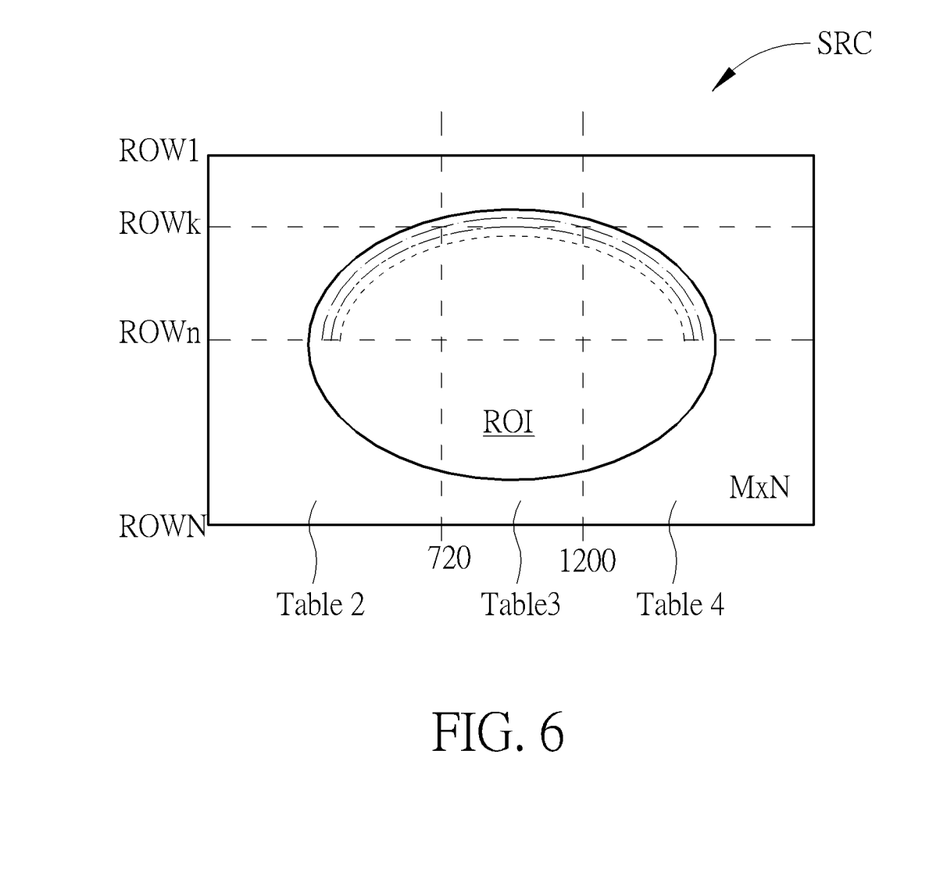
FIG. 6 is a diagram illustrating the image dewarping process of another embodiment.

FIG. 6 is a diagram illustrating an image dewarping process of another embodiment. The source image SRC may be an image generated by the captured by the lens 13 with the image sensor 14. The source image SRC includes M×N pixels, e.g., 1920×1080 pixels. In practice, the image sensor 14 can divide the pixels in the source image SRC into N input rows of pixels ROW1~ROWN, and transfer the N input rows of pixels to the processor 11 sequentially from top to bottom. In the embodiment, a region of interest ROI may be drawn from the source image SRC according to the lens parameters of the lens 13. Each input row of pixels may be divided into P input segments of pixels according to the lens parameters of the lens 13 and the region of interest ROI and generate P N×2 tables to record the starting and ending coordinates of the input segment of pixels located in the region of interest ROI. P can be an integer greater than 1. For example, if P is equal to 3, that is, each input row of pixels is divided into 3 input segments of pixels, and the coordinates are recorded in 3 tables. An example of the 3 tables is as follows:

TABLE 2

| Input Row | Starting Coordinate | Ending Coordinate |
|---|---|---|
| 1 | 0 | 0 |
| 2 | 0 | 0 |
| 3 | 0 | 0 |
| . | . | . |
| . | . | . |
| 110 | 0 | 0 |
| 111 | 0 | 0 |
| 112 | 0 | 0 |
| . | . | . |
| 118 | 715 | 719 |
| 119 | 704 | 719 |

TABLE 2-continued

| Input Row | Starting Coordinate | Ending Coordinate |
|---|---|---|
| 120 | 698 | 719 |
| . | | |
| . | | |
| . | | |
| 539 | 355 | 719 |
| 540 | 355 | 719 |
| 541 | 355 | 719 |
| . | | |
| . | | |
| . | | |
| N | 0 | 0 |

TABLE 3

| Input Row | Starting Coordinate | Ending Coordinate |
|---|---|---|
| 1 | 0 | 0 |
| 2 | 0 | 0 |
| 3 | 0 | 0 |
| . | | |
| . | | |
| 110 | 904 | 1016 |
| 111 | 867 | 1053 |
| 112 | 819 | 1101 |
| . | | |
| . | | |
| 118 | 720 | 1199 |
| 119 | 720 | 1199 |
| 120 | 720 | 1199 |
| . | | |
| . | | |
| 539 | 720 | 1199 |
| 540 | 720 | 1199 |
| 541 | 720 | 1199 |
| . | | |
| . | | |
| N | 0 | 0 |

TABLE 4

| Input Row | Starting Coordinate | Ending Coordinate |
|---|---|---|
| 1 | 0 | 0 |
| 2 | 0 | 0 |
| 3 | 0 | 0 |
| . | | |
| . | | |
| 110 | 0 | 0 |
| 111 | 0 | 0 |
| 112 | 0 | 0 |
| . | | |
| . | | |
| 118 | 1200 | 1204 |
| 119 | 1200 | 1215 |
| 120 | 1200 | 1221 |
| . | | |
| . | | |
| 539 | 1200 | 1565 |
| 540 | 1200 | 1565 |
| 541 | 1200 | 1565 |
| . | | |
| . | | |
| N | 0 | 0 |

Tables 2, 3 and 4 corresponding to the input rows of pixels are segmented at the 720th pixel and the 1200th. The number N is determined by the image resolution. For example, the number N can be 1080, 2048 and so on. The processor 11 can determine which input pixels are located in the region of interest ROI and store in which memory block according to the Tables 2, 3 and 4. If the input segment of pixels does not include input pixels located in the region of interest ROI, both the starting and ending coordinates are represented by 0. Furthermore, the three input segments of pixels of an input row of pixels are stored in three different blocks in the memory 12. Taking the Input Row 540 as an example, the 355th to 719th pixels can be stored in the first memory block; the 720th to 1199th pixels can be stored in the second memory block; the 1200th to 1565th pixels can be stored in the third memory block. In the embodiment, image dewarping can be performed in the same manner as described in FIGS. 4A and 4B. In other words, it can use a coordinate transformation matrix to complete image dewarping. However, the differences between this embodiment and the aforementioned embodiment are described in the follow paragraphs.

Figure 7A:
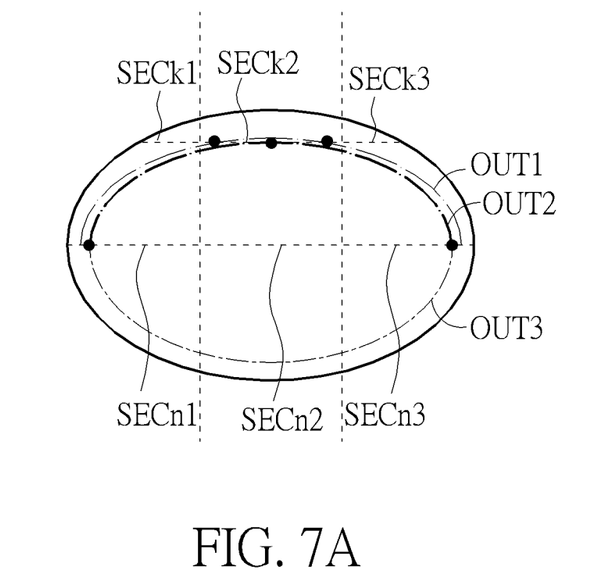
FIGS. 7A and 7B are diagrams illustrating releasing the input segments of pixels from the memory in the image warping process of FIG. 6.
Figure 7B:
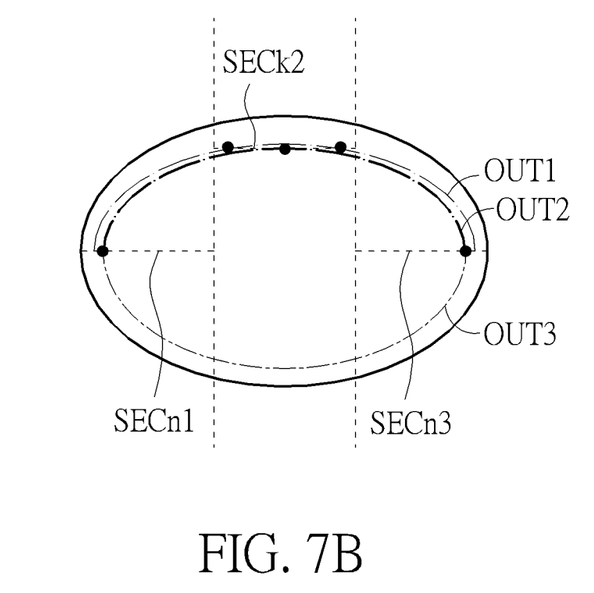

FIGS. 7A and 7B are diagrams illustrating releasing the input segments of pixels from the memory 12 in the image warping process of FIG. 6. As shown in FIG. 7A, the input row of pixels ROWk can be divided into three input segments of pixels SECk1, SECk2 and SECk3. Also, the input row of pixels ROWn can be divided into three input segments of pixels SECn1, SECn2 and SECn3. When the coordinate transformation of the output row of pixels OUT1 has been completed, as shown in FIG. 7B, the input segment of pixels SECk2 still includes the pixels corresponding the output row of pixels OUT2 that have not been transformed yet, but the input segments of pixels SECk1 and SECk3 do not include the pixels corresponding to other output rows of pixels. Therefore, the memory space occupied by the input segments of pixels SECk1 and SECk3 can be released from the memory 12, while the memory space occupied by the input segment of pixels SECk2 cannot be released yet.

At another point in time, the input segments of pixels SECn1 and SECn3 still include the pixels corresponding to the output row of pixels OUT3 that have not been transformed. Thus, the memory space occupied by the input segments of pixels SECk1 and SECk3 cannot be released yet. However, the input segment of pixels SECn2 does not include pixels corresponding to other output rows of pixels. Thus the memory space occupied by the input segment of pixels SECn2 can be released from the memory 12.

Figure 8:
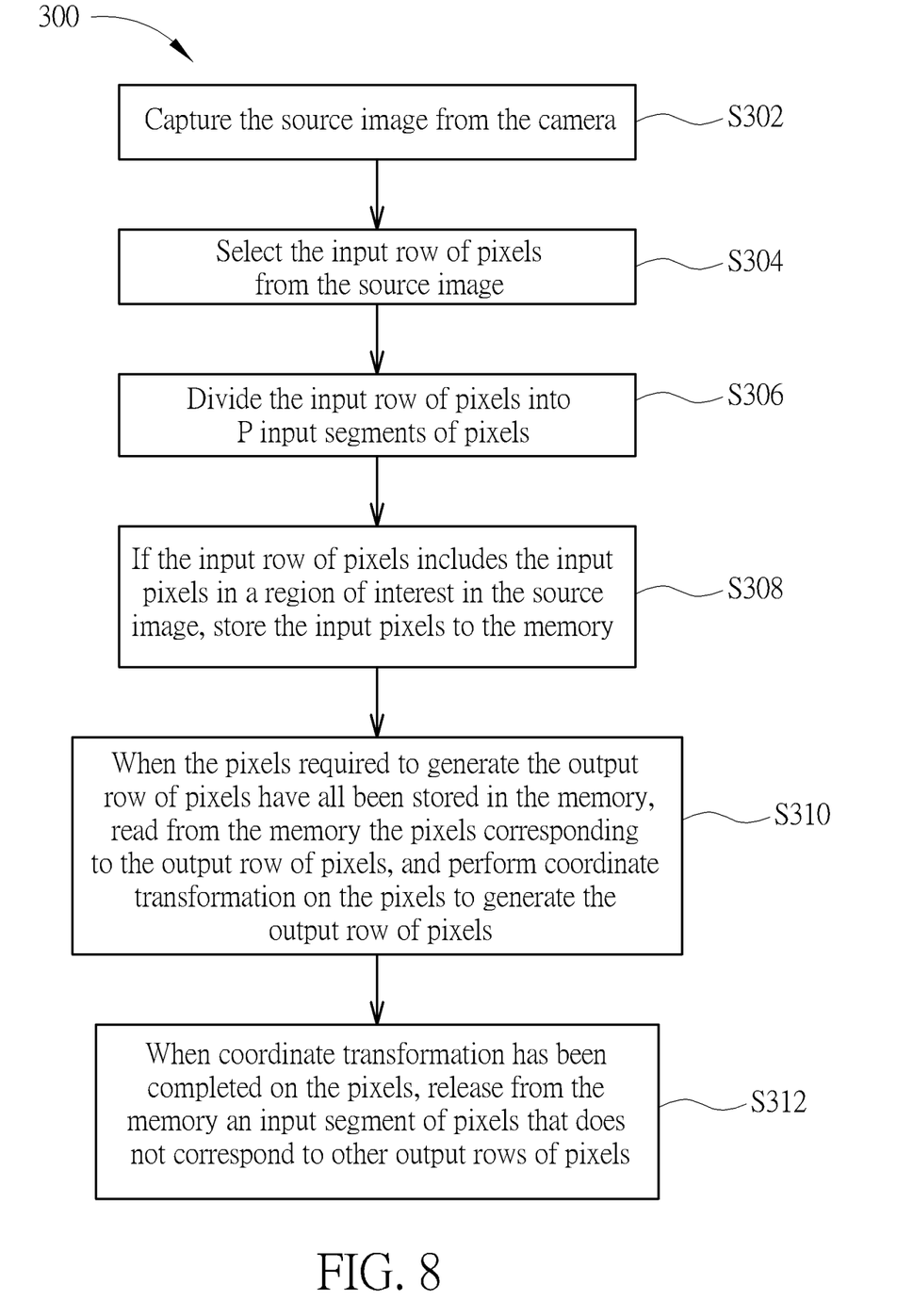
FIG. 8 is a flowchart of the image dewarping method of the another embodiment.

FIG. 8 is a flowchart of the image dewarping method 300 of another embodiment. The image dewarping method 300 includes the following steps:

S302: Capture the source image SRC from the camera 10;
S304: Select the input row of pixels ROWk from the source image SRC;

S306: Divide the input row of pixels ROWk into P input segments of pixels;

S308: If the input row of pixels ROWk includes the input pixels in a region of interest ROI in the source image SRC, store the input pixels to the memory 12;

S310: When the pixels required to generate the output row of pixels OUT1 have all been stored in the memory 12, read from the memory 12 the pixels corresponding to the output row of pixels OUT1, and perform coordinate transformation on the pixels to generate the output row of pixels OUT1; and S312: When coordinate transformation has been completed on the pixels, release from the memory 12 an input segment of pixels that does not correspond to other output rows of pixels.

After releasing the memory space occupied by the input segment of pixels, the processor 11 can wait until all the pixels required to generate the output row of pixels OUT2 have been stored in the memory 12, and then use the coordinate transformation matrix H to perform coordinate transformation on the pixels to generate the output row of pixels OUT2. Then, the input segment of pixels that has completed coordinate transformation and does not correspond to other output rows of pixels can be released from the memory 12. The process can be repeated until the coordinate transformation has been completed for the source image SRC and the destination image DST.

The image dewarping method provided by the embodiment does not need to store the entire source image SRC. It can simultaneously transform and output rows of pixels of the destination image DST while inputting the rows of pixels of the source image SRC to the memory 12. It can also the release input segments of pixels before other pixels complete coordinate transformation. This method reduces memory loading and improves image processing performance under limited computing resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of image dewarping, comprising:
   capturing a source image from a camera;
   selecting an input row of pixels from the source image;
   if the input row of pixels comprises a plurality of input pixels in a region of interest (ROI) in the source image, storing the plurality of input pixels to a memory to generate an input segment of pixels, wherein the input segment of pixels is a portion of the input row of pixels stored in the memory;
   when a plurality of pixels required to generate an output row of pixels are all stored in the memory, reading from the memory the plurality of pixels corresponding to the output row of pixels, and performing coordinate transformation on the plurality of pixels to generate the output row of pixels; and
   when coordinate transformation has been completed on the plurality of pixels, releasing from the memory an input segment of pixels of the plurality of input segments of pixels that does not correspond to other output rows of pixels.

2. The method of claim 1, wherein when the plurality of pixels required to generate the output row of pixels are all stored in the memory, reading from the memory the plurality of pixels corresponding to the output row of pixels, and performing coordinate transformation on the plurality of pixels to generate the output row of pixels, comprises:
   searching for coordinates corresponding to a last input pixel of the output row of pixels according to coordinates of at least one pixel of the output row of pixels and a transformation matrix; and
   when the last input pixel has been stored in the memory, performing coordinate transformation on the plurality of pixels through a transformation matrix to generate the output row of pixels.

3. The method of claim 2, further comprising generating the transformation matrix according to a plurality of lens parameters of a lens of the camera.

4. The method of claim 1, further comprising generating an N×2 table for recording starting coordinates and ending coordinates of the region of interest in N input rows of pixels, wherein N is an integer greater than 0.

5. The method of claim 1, wherein when coordinate transformation has been completed on the plurality of pixels, releasing from the memory the input segment of pixels of the plurality of input segments of pixels that does not correspond to other output rows of pixels is when coordinate transformation has been completed on the plurality of pixels and there are still pixels corresponding to other output rows of pixels not transformed, releasing from the memory the input segment of pixels of the plurality of input segments of pixels that does not correspond to other output rows of pixels.

6. The method of claim 1, further comprising drawing the region of interest in the source image according to a plurality of lens parameters of a lens of the camera.

7. A method of image dewarping, comprising:
   capturing a source image from a camera;
   selecting an input row of pixels from the source image;
   dividing the input row of pixels into P input segments of pixels;
   if the input row of pixels comprises a plurality of input pixels in a region of interest (ROI) in the source image, storing the plurality of input pixels to a memory;
   when a plurality of pixels required to generate an output row of pixels are all stored in the memory, reading from the memory the plurality of pixels corresponding to the output row of pixels, and performing coordinate transformation on the plurality of pixels to generate the output row of pixels; and
   when coordinate transformation has been completed on the plurality of pixels, releasing from the memory an input segment of pixels of the plurality of input segments of pixels that does not correspond to other output rows of pixels;
   wherein P is an integer greater than 1.

8. The method of claim 7, wherein performing coordinate transformation on the plurality of pixels to generate the output row of pixels is performing coordinate transformation on the plurality of pixels through a transformation matrix to generate the output row of pixels.

9. The method of claim 7, wherein dividing the input row of pixels into the P input segments of pixels is dividing the input row of pixels into the P input segments of pixels according to a plurality of lens parameters of a lens of the camera and the region of interest.

10. The method of claim 7, further comprising generating P N×2 tables for recording starting coordinates and ending coordinates of the region of interest in each of the P segments of pixels, wherein N is an integer greater than 0.

11. The method of claim 7, wherein when coordinate transformation has been completed on the plurality of pixels, releasing from the memory the input segment of pixels of the plurality of input segments of pixels that does not correspond to other output rows of pixels is when coordinate transformation has been completed on the plurality of pixels and there are still pixels corresponding to other output rows of pixels not transformed, releasing from the memory the input segment of pixels of the plurality of input segments of pixels that does not correspond to other output rows of pixels.

12. The method of claim 7, further comprising drawing the region of interest in the source image according to a plurality of lens parameters of a lens of the camera.

13. A device of image processing, comprising:
a camera configured to capture a source image;
a memory; and
a processor coupled to the camera and the memory, and configured to:
  select an input row of pixels from the source image;
  if the input row of pixels comprises a plurality of input pixels in a region of interest (ROI) in the source image, store the plurality of input pixels to a memory to generate an input segment of pixels, wherein the input segment of pixels is a portion of the input row of pixels stored in the memory;
  when a plurality of pixels required to generate an output row of pixels are all stored in the memory, read from the memory the plurality of pixels corresponding to the output row of pixels, and perform coordinate transformation on the plurality of pixels to generate the output row of pixels; and
  when coordinate transformation has been completed on the plurality of pixels, release from the memory an input segment of pixels of the plurality of input segments of pixels that does not correspond to other output rows of pixels.

14. The device of claim 13, wherein:
coordinates corresponding to a last input pixel of the output row of pixels are searched according to coordinates of at least one pixel of the output row of pixels and a transformation matrix; and
when the last input pixel has been stored in the memory, coordinate transformation is performed on the plurality of pixels through a transformation matrix to generate the output row of pixels.

15. The device of claim 14, wherein the transformation matrix is generated according to a plurality of lens parameters of a lens of the camera.

16. The device of claim 13, wherein an N×2 table is generated for recording starting coordinates and ending coordinates of the region of interest in N input rows of pixels, and N is an integer greater than 0.

17. The device of claim 13, wherein when coordinate transformation has been completed on the plurality of pixels and there are still pixels corresponding to other output rows of pixels not transformed, the input segment of pixels of the plurality of input segments of pixels that does not correspond to other output rows of pixels is released from the memory.

18. The device of claim 13, wherein the region of interest in the source image is drawn according to a plurality of lens parameters of a lens of the camera.

* * * * *